(12) United States Patent
Leung et al.

(10) Patent No.: US 6,440,384 B1
(45) Date of Patent: Aug. 27, 2002

(54) COMPOSITION FOR STORAGE BATTERY CELLS AND METHOD FOR MAKING SAME

(75) Inventors: Tin Pui Leung; Ho Ching Wong; Wah-Sing Miu, all of Kowloon (HK)

(73) Assignee: Hong Kong Polytechnic University (HK)

( * ) Notice: Subject to any disclaimer, the term of this patent is extended or adjusted under 35 U.S.C. 154(b) by 0 days.

(21) Appl. No.: 09/510,983

(22) Filed: Feb. 21, 2000

(30) Foreign Application Priority Data

Feb. 25, 1999 (GB) .............................................. 9904381

(51) Int. Cl.[7] ........................ C01G 21/02; H01M 4/56; H01M 4/57
(52) U.S. Cl. ........................ 423/619; 429/225; 429/228
(58) Field of Search .......................... 423/619; 429/225, 429/228

(56) References Cited

U.S. PATENT DOCUMENTS

| | | | | |
|---|---|---|---|---|
| 4,140,589 A | * | 2/1979 | Hradovsky et al. | 204/2.1 |
| 4,271,244 A | * | 6/1981 | Gabano et al. | 429/197 |
| 4,707,911 A | * | 11/1987 | Kober et al. | 29/623.5 |
| 4,812,426 A | * | 3/1989 | Takagi | 501/136 |
| 5,683,834 A | * | 11/1997 | Fujimot et al. | 429/218 |
| 6,004,695 A | * | 12/1999 | Goda et al. | 429/218.1 |

FOREIGN PATENT DOCUMENTS

GB    1280057    7/1972

OTHER PUBLICATIONS

Derwent Abstract 1997–260082, Zhao Shulong
Derwent Abstract 1976–61778X, Rhein Westfal Elek.

* cited by examiner

Primary Examiner—Steven P. Griffin
Assistant Examiner—Cam N. Nguyen
(74) Attorney, Agent, or Firm—Jackson Walker L.L.P.

(57) ABSTRACT

Composition of matter useful as an active mass of positive electrodes for a lead acid storage cell has an X-ray diffraction pattern substantially as shown in the. Figure. The matter is formed from lead-cadmium deposits using a methanesulfonic acid electrolyte system and pulse current.

5 Claims, 4 Drawing Sheets

COMPOSITION FOR STORAGE BATTERY CELLS AND METHOD FOR MAKING SAME

BACKGROUND OF THE INVENTION

1. Field of the Invention

The invention relates to storage cells and to devices, including storage batteries which incorporate such cells.

2. Description of Prior Art

The invention relates particularly to rechargeable storage cells that are generally well-known but suffer a major disadvantage of requiring a relatively long charging up time. The invention relates more particularly to electrodes and storage cells of the kind described in U.S. Pat. No. 4,143,216 which comprises a lead-acid storage cell which can be charged more quickly due to its provision of a crystalline active mass electrode material.

SUMMARY OF THE INVENTION

It is an object of the invention to provide an improved active mass useful for electrodes in storage cells and methods of producing such active masses.

According to the invention there is provided a composition of matter useful as an active mass of positive electrodes in storage cells, said composition consisting of crystalline lead dioxide ($PbO_2$) having an X-ray diffraction pattern substantially as shown in FIG. 1.

The composition may include trace amounts of cadmium.

The composition may be formed by electrolysis using a lead-cadmium electrode, an electrolyte of dilute sulfuric acid, and pulsed current.

The lead-cadmium electrode may be formed by electrolytic deposition using an electrolyte comprising lead methanesulfonate, cadmium methanesulfonate and methanesulfonic acid, and pulsed current.

The invention may provide a porous lead material for negative electrodes in storage cells formed, using the lead dioxide composition, by electrolytic conversion in dilute sulfuric acid and applying pulsed current.

The invention may provide various compositions of matter useful as an active mass for electrodes in lead acid storage cells formed from electrodeposition using a methanesulfonic acid electrolyte system and pulsed current.

BRIEF DESCRIPTION OF THE DRAWINGS

Active masses of electrode material for storage cells, methods of producing such materials and storage cells containing electrodes using said active masses according to the invention will now be described by way of example with reference to the accompanying drawings in which.

DESCRIPTION OF THE PREFERRED EMBODIMENTS

Figure 1:
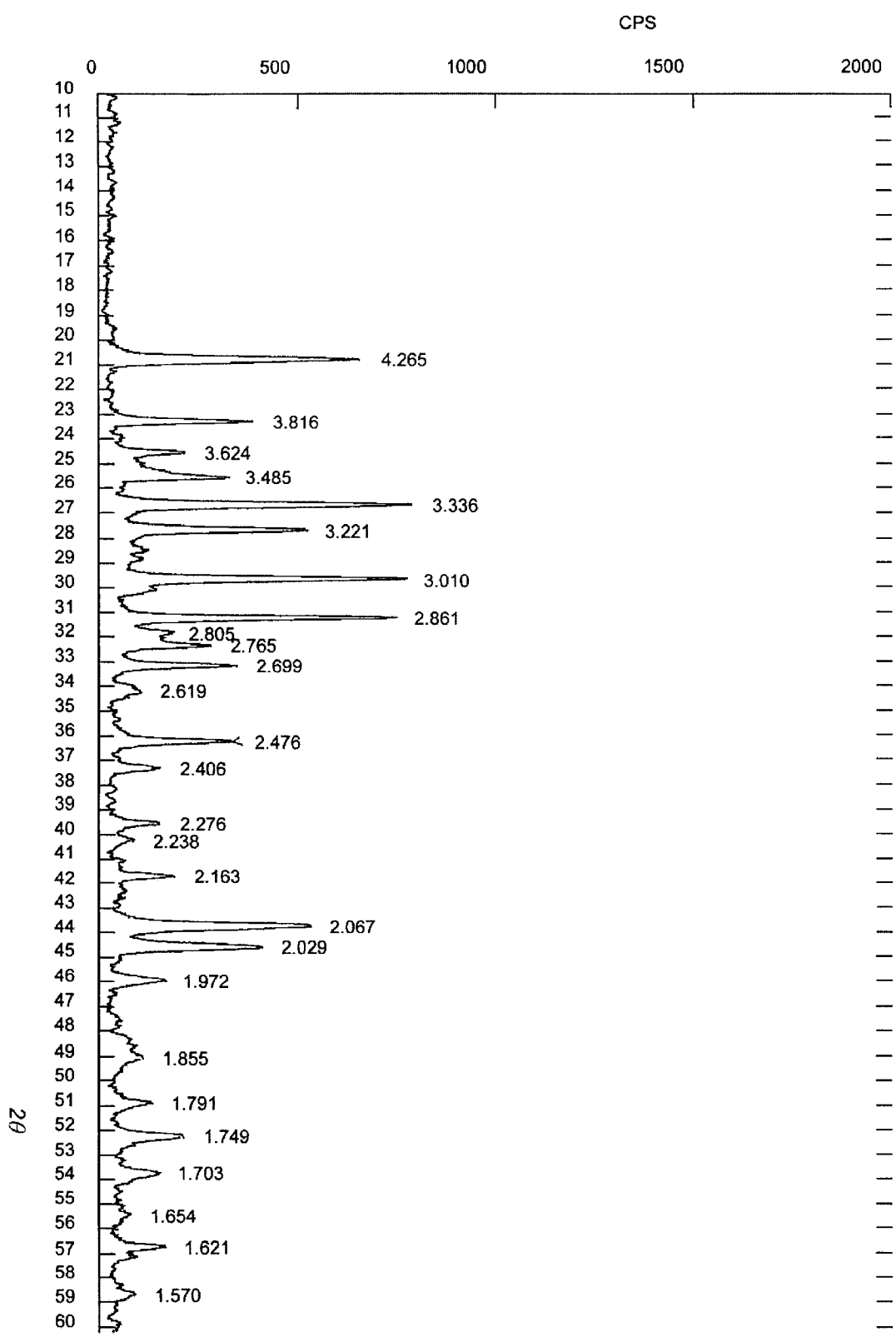
FIG. 1 shows an X-ray diffraction pattern of an active mass for a positive electrode.
Figure 2:
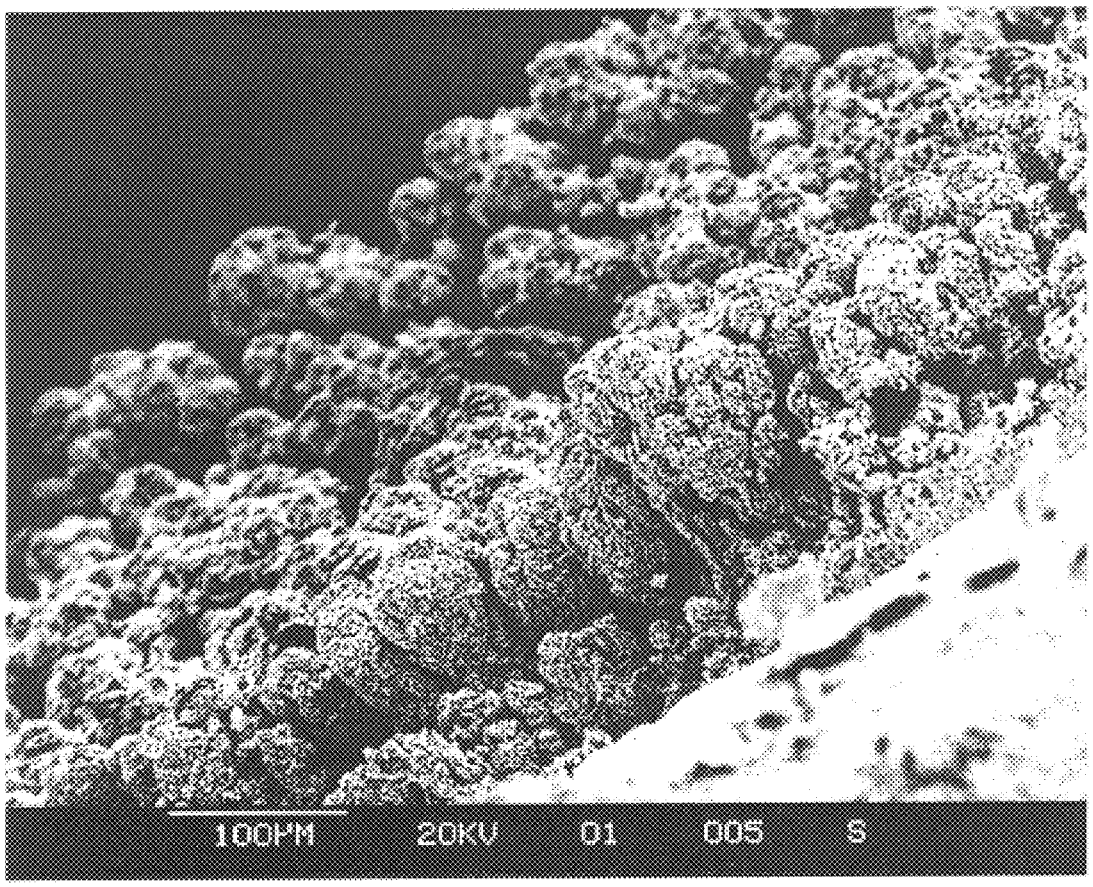
FIG. 2 is a photograph of the material of FIG. 1.

Referring to the drawings, in FIG. 1 the active mass for a positive electrode comprises crystalline lead dioxide ($PbO_2$) having an X-ray diffraction pattern as shown. The lead dioxide is converted from a deposited lead-cadmium layer using sulfuric acid electrolyte and pulsed current. Results from atomic absorption analysis showed that there are trace amounts (0.06%) of cadmium in the layer of lead dioxide. A magnified photograph (FIG. 2) illustrates the porous crystalline nature of the active mass lead dioxide material.

Figure 3:
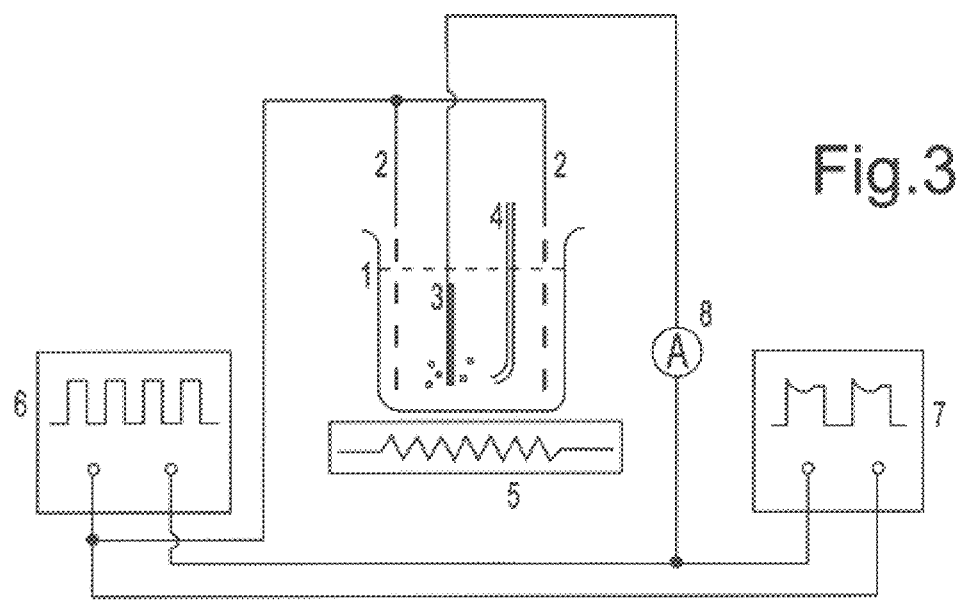
FIG. 3 shows schematically apparatus for electrodeposition of lead-cadmium sheets.

The lead-cadmium layer is produced by electrolysis using a cell as shown in FIG. 3.

A vessel 1 is filled with the electrolyte. The two positive electrodes (anodes) 2 are mounted at opposite sides with a negative electrode (cathode) 3 at the center. Moderate air agitation is provided via a compressed air tube 4. The electrolyte is heated to a predetermined temperature on a hot plate with a built-in temperature controller 5. The pulse current is monitored with an oscilloscope 6. The anodes and cathode are connected to the positive and negative terminals of a DC pulse current power supply 7. An ammeter 8 measures the average current.

In a first step of the formation of the active masses, the anode consists of platinized titanium mesh. The cathode comprises a conductive material, such as lead foil, aluminium and stainless steel sheet. The vessel 1 contains a methanesulfonic acid electrolyte system. The electrolyte system is formed of cadmium methanesulfonate (34 g/L), lead methanesulfonate (8.5 g/L), and methanesulfonic acid (165 g/L). Additives comprising Resorin (5 g/L) and polyethyleneglycol (1.5 g/L) are present. The electrolyte was made up to 4 liters by mixing 1800 ml of cadmium methanesulfonate, 80 ml of lead methanesulfonate, 480 ml of sulphonic acid, 160 ml of the additives and 2478 ml of deionized water.

The optimum operational parameters are:

(i) pulse current 0.25 ms ON/0.75 ms OFF (ii) current density 6 $A/dm^2$ (iii) temperature 55–60° C.

(iv) moderate air agitation

The methanesulfonic acid based process is capable of electrodeposition of lead-cadmium from 0–100% cadmium. Electrodeposited or electroformed lead-cadmium sheets composed of 50% cadmium are used in this embodiment for subsequent conversion to porous $PbO_2$ and Pb electrodes for the storage cells.

Figure 5:
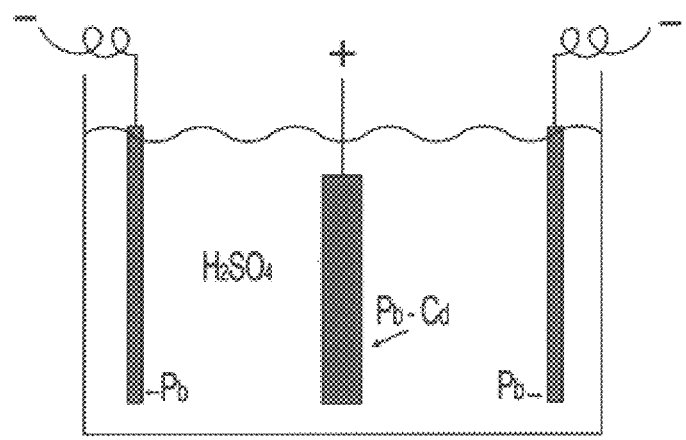
FIG. 5 shows schematically the electrolytic conversion of lead-cadmium to porous lead dioxide.

In order to produce a crystalline lead dioxide layer, a second step is carried out in the cell of FIG. 5, using the lead-cadmium deposit as the anode, and pure lead sheets as the cathodes. The electrolyte is sulfuric acid solution (specific gravity 1.10). A pulsed current is applied as before.

Figure 6:
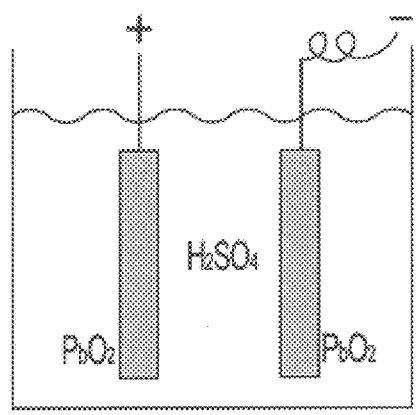
FIG. 6 shows schematically the apparatus for electrolytic conversion of porous lead dioxide to porous lead by pulse current.
Figure 4:
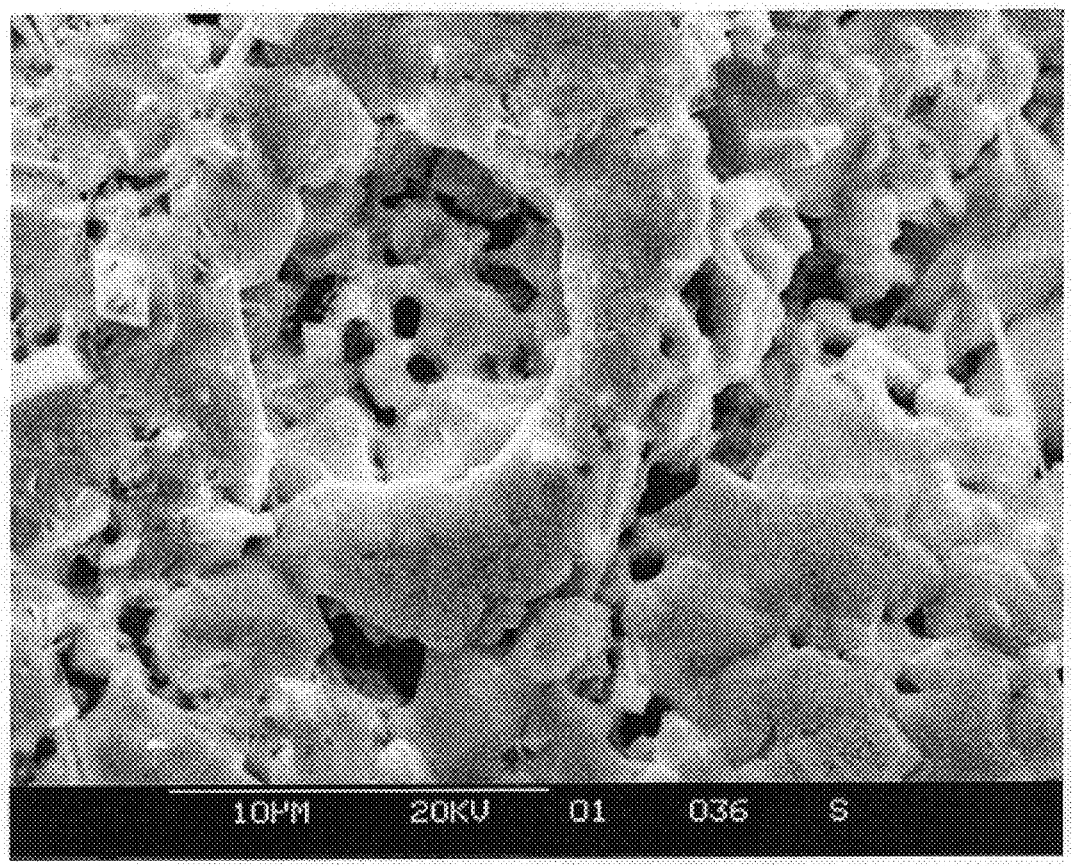
FIG. 4 shows a photograph of an active mass for a negative electrode.

The active mass for negative electrodes is produced by using the electrode material formed in the second step for both negative and positive electrodes in the cell of FIG. 6. The electrolyte is dilute sulfuric acid solution (specific gravity 1.10), and pulsed current is used as before but with a reduced current density of 2.8 $A/dm^2$. The lead diode on the cathode is reduced by electrolysis to form porous lead. The porous lead is used to form negative electrodes for a storage cell. FIG. 4 shows a photograph of the porous lead formed by this process.

A storage cell according to the invention comprises an anode (porous lead dioxide) and a cathode (porous lead) placed vertically in a vessel containing sulfuric acid solution (specific gravity 1.28). The storage cell may be made up of a number of interspersed positive and negative electrodes, in a manner otherwise well-known per se for lead acid storage cells. Commercial polypropylene separators may be used between the electrodes, which electrodes are placed about 1 cm apart.

The capacity of battery made up as described was measured at constant current of 80 mA to an end-of-discharge voltage of 1.82V at 20° C. After 9.5 hours the battery voltage dropped from 2.15 to 1.82, the current remained at 80 mA. The capacity was therefore calculated to be 760 mAh. However, the battery discharged at voltages in excess of 2 volts for most of the 9.5 hours.

The capacity of the battery was also measured and determined by the weight of the positive active material to be 845 mAh. The resulting utilisation ratio was therefore 89%.

For charging the battery pulse current was used with an average current density of 3.8 A/dm$^2$. Charging was fully completed in less than 15 minutes. The battery life was determined at 600 mA constant current and automatic charge and discharge cycling at 20° C. The battery life was found to be in excess of 1500 cycles.

The battery was found to be capable of being discharged to 0.08 volts and recharged satisfactorily.

It will be noted that methanesulfonic acid electrolyte system is relatively safe and environmentally friendly, especially as compared with electrolyte systems described in U.S. Pat. No. 4,143,216. It will be appreciated, for example, that methanesulfonic acid decomposes easily into harmless components.

It will be appreciated that the electroforming of the active masses does not require a substrate so that an overall inherent weight reduction can be beneficially provided by embodiments of the invention.

We claim:

1. A composition of matter useful as an active mass of positive electrodes in storage cells, said composition comprising crystalline lead dioxide ($PbO_2$) characterized by an X-ray diffraction pattern as shown in FIG. 1.

2. A composition of matter as claimed in claim 1 including trace amounts of cadmium.

3. A composition of matter as claimed in claim 1, formed by electrolysis using a lead-cadmium electrode, an electrolyte of dilute sulfuric acid, and pulsed current.

4. A composition of matter according to claim 3, in which a lead-cadmium alloy is formed by electrolytic deposition using an electrolyte comprising lead methanesulfonate, cadmium methanesulfonate and methanesulfonic acid, and pulsed current.

5. A porous lead material for negative electrodes in storage cells using the composition of claim 1, and formed by electrolytic conversion of said active mass using dilute sulfuric acid and pulsed current.

* * * * *